[19] United States Patent
Dickson

[11] Patent Number: 4,827,409
[45] Date of Patent: May 2, 1989

[54] HIGH SPEED INTERCONNECT UNIT FOR DIGITAL DATA PROCESSING SYSTEM

[75] Inventor: Robert Dickson, Arlington, Mass.

[73] Assignee: Digital Equipment Corporation, Maynard, Mass.

[21] Appl. No.: 889,418

[22] Filed: Jul. 24, 1986

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,999,163 | 12/1976 | Levy et al. | 364/200 |
| 4,071,887 | 1/1978 | Daly et al. | 364/200 |
| 4,112,490 | 9/1978 | Pohlman et al. | 364/200 |
| 4,232,366 | 11/1980 | Levy et al. | 364/200 |
| 4,257,095 | 3/1981 | Nadir | 364/200 |
| 4,300,193 | 1/1981 | Bradley et al. | 364/200 |
| 4,319,323 | 3/1982 | Ermolovich et al. | 364/200 |
| 4,490,784 | 12/1984 | Ives et al. | 364/200 |

Primary Examiner—Gareth D. Shaw
Assistant Examiner—Adolfo L. Ruiz
Attorney, Agent, or Firm—Kenyon & Kenyon

[57] ABSTRACT

A digital data processing system transfers information with an external device through an interconnect unit over a bus which includes separate sets of lines for transferring control information and transferring user information. The user information lines include bidirectional information transfer lines and undirectional antiparallel lines for transferring direction control signals and synchronization signals between the interconect unit and the external device, the direction control signals indentifying the direction of transfer over the information transfer lines, and the synchronization signals identifying when the transmitting unit has transmitted the signals and when the receiving unit has latched the signals. The control information lines include unidrectional antiparallel lines for transferring control information and a synchronization signal. The synchronization signal is transmitted when control information signals are being transmitted on the control information lines.

6 Claims, 5 Drawing Sheets

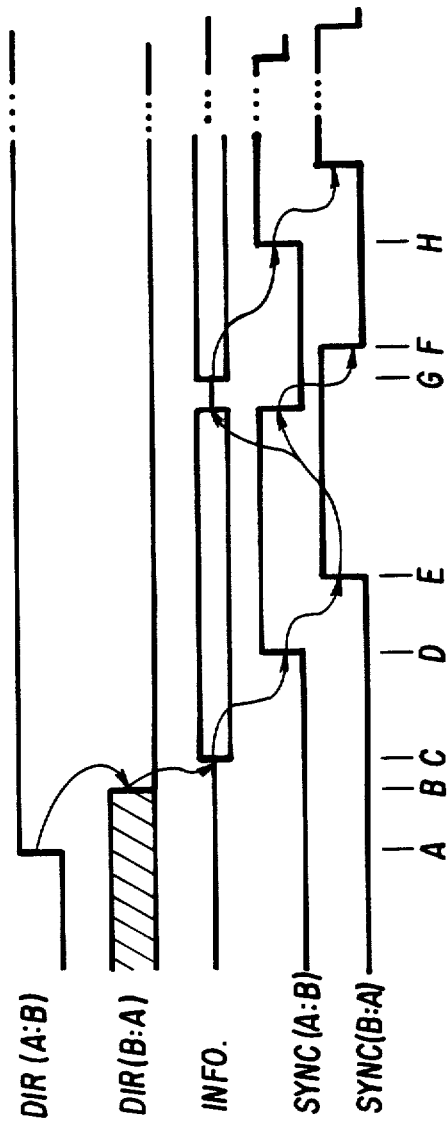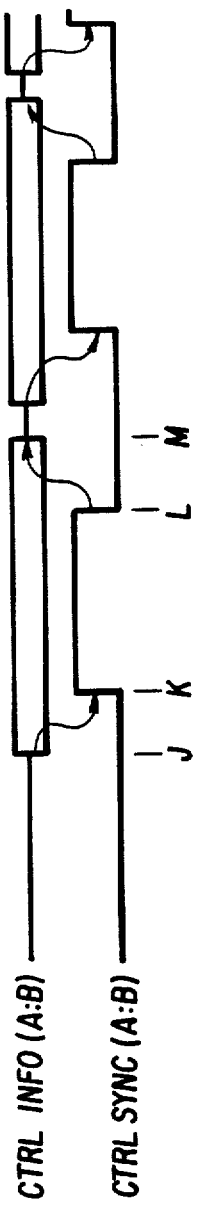

HIGH SPEED INTERCONNECT UNIT FOR DIGITAL DATA PROCESSING SYSTEM

BACKGROUND OF THE INVENTION

1. Field of the Invention

The invention relates generally to the field of digital data processing systems, and more specifically to high speed point-to-point interconnection apparatus for transferring data into or out of the system from or to an external device.

2. Description of the Prior Art

A typical digital data processing system includes three basic elements, namely a processor element, a memory element, and an input/output element. The memory element stores information in addressable storage locations. This information includes both data and instructions for processing the data. The processor element includes one or more digital data processing units, each of which causes information to be transferred, or fetched, to it from the memory element, interprets the incoming information as either instructions or data, and processes the data in accordance with the instructions. The results are then stored in addressed locations in the memory element.

The input/output element also communicates with the memory element in order to transfer information into the system and to obtain the processed data from it. Units comprising the input/output element normally operate in accordance with control information supplied to it by the processor element. The control information defines the operation to be performed by an input/output unit. At least one class of operations performed by an input/output unit is the transfer of user information, that is, information used by a user program, between the input/output unit and the memory element. Typical units comprising the input/output element include, for example, printers, teletypewriters, and video display terminals, and may also include secondary information storage devices such as disk or tape storage units. The input/output units may also include point-to-point information transfer units, that is, interconnect units, for connection to, typically, one external device. An interconnect unit transfers information at a very high rate between and system and the external device. Illustrative external devices include, for example, an array processor, a special scientific laboratory instrument or even another digital data processing system.

U.S. Pat. No. 4,319,323, entitled Communications Device For Data Processing System, issued to Thomas R. Ermolovich, et al., on Mar. 9, 1982, and assigned to the assignee of the present invention, describes an interconnect unit (termed therein a "communications unit") for transferring information between a digital data processing system and an external device. The interconnect unit described in the patent connects to the external device over a bus which transfers information between two and only two devices, namely, the interconnect unit and the external device. The interconnect unit includes a section which transfers control information and a section which transfers user information. As with control information provided by the processor to control an input/output unit, the control information transferred over the bus between the interconnect unit and the external device provides information about, and defines, the transfer of user information therebetween over the user information transfer section.

One problem which has arisen with the interconnect unit described in the afore-mentioned patent is tha tthe protocol for transferring information over the bus is a complex one, which makes it relatively difficult and expensive to construct an external device that can connect to it.

For example, the user information transfer section transfers information synchronously, that is, it includes a line which transfers a timing signal which times the data as it it transferred between the two devices. In addition, the transfer section includes a plurality of wires for transferring signals between the interconnect unit and the external device relating to the current status of the units in connection with the information transfer. In particular, the signals indicate whether the units (a) are currently engaged in a data transfer and (b) are currently able to transmit or receive data, while engaged in the transfer. That is, the signals indicate whether or not the units are "stalled". In a synchronous transfer, information signals must be placed on the data lines by the transmitting unit and latched by the receiving unit with every tick of the transfer synchronizing signal. However, in many circumstances, the transmitting unit may, because of delays it may have in obtaining information to transfer, have short periods of time during which it has no information to transmit. Similarly, the receiving unit may be temporarily unable to take data which the transmitting device has ready for it. If either of these were to occur, for example, in a transfer between a memory and a disk or tape storage unit, an error would be noted by the disk or tape storage unit, and the transfer would be aborted. The processor would then be interrupted, which may cause the transfer to be repeated. However, if the external device were one of certain types of scientific instruments, repeating the transfer may not be possible or practical.

SUMMARY OF THE INVENTION

The invention provides a new and improved interconnect unit including a bus for transferring information, including both control and user information, between the unit and a single external device, the bus having a simplified protocol for accommodating stalls in transferring information between the two units.

In brief, the new interconnect unit connects to, and transfers information with, an external device over a bus which has a control information transfer section and a user information transfer section. The user information transfer section includes user information transfer lines over which user information is transferred. Prior to transferring user information, the transmitting device asserts a direction signal which indicates that it will be transmitting user information. After placing user information signals on corresponding lines of the bus, the transmitting unit asserts a synchronizing signal to synchronize the information transfers. The synchronizing signal enables the receiving unit to receive and latch the user information signals. On receiving the user information signals, the receiving unit asserts an acknowledgement signal which indicates that it has received the user informaton word, which, in turn, allows the transmitting device to transmit further user information signals.

The interconnect unit transfers information over selected ones of the user information transfer lines, to facilitate accommodation to external devices which do not transfer information signals over all of the user information transfer lines at one time. The interconnect unit packs the received information for transmission to the system memory, or it unpacks the information which it receives from the system memory and transmits it over the selected user information transfer lines.

The control information transfer section includes two sets of lines each for transferring control information unidirectionally between one of the units and the other. The sets of lines are antiparallel, that is, one set transfers control information from one unit to the second unit, and the other set transfers control information from the second unit to the first. Each set of lines has an associated synchronization signal which, when asserted, indicates to the receiving device that the state of the signals on the associated control information transfer lines has changed. A unit receiving the control information signals and the synchronization signal may use the strobing signal to initiate latching of the control information signals, or it may alternatively ignore the synchronization signal and continuously monitor the control information lines and use the signals transferred thereover as indications of the status of the transmitting unit.

The synchronizing signal/acknowledgement signal protocol of the user information transfer section allows the transmitting and receiving units to stall, or temporarily stop, transferring user information while a transfer operation is in progress, without a transfer error being processed. The protocol of the control information transfer section permits the flexible use of the control information transfer lines.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4, comprising FIGS. 4A and 4B, depicts timing diagrams useful in understanding the transfer protocol for the interconnect depicted in FIG. 3.;

DETAILED DESCRIPTION OF AN ILLUSTRATIVE EMBODIMENT

Figure 1:
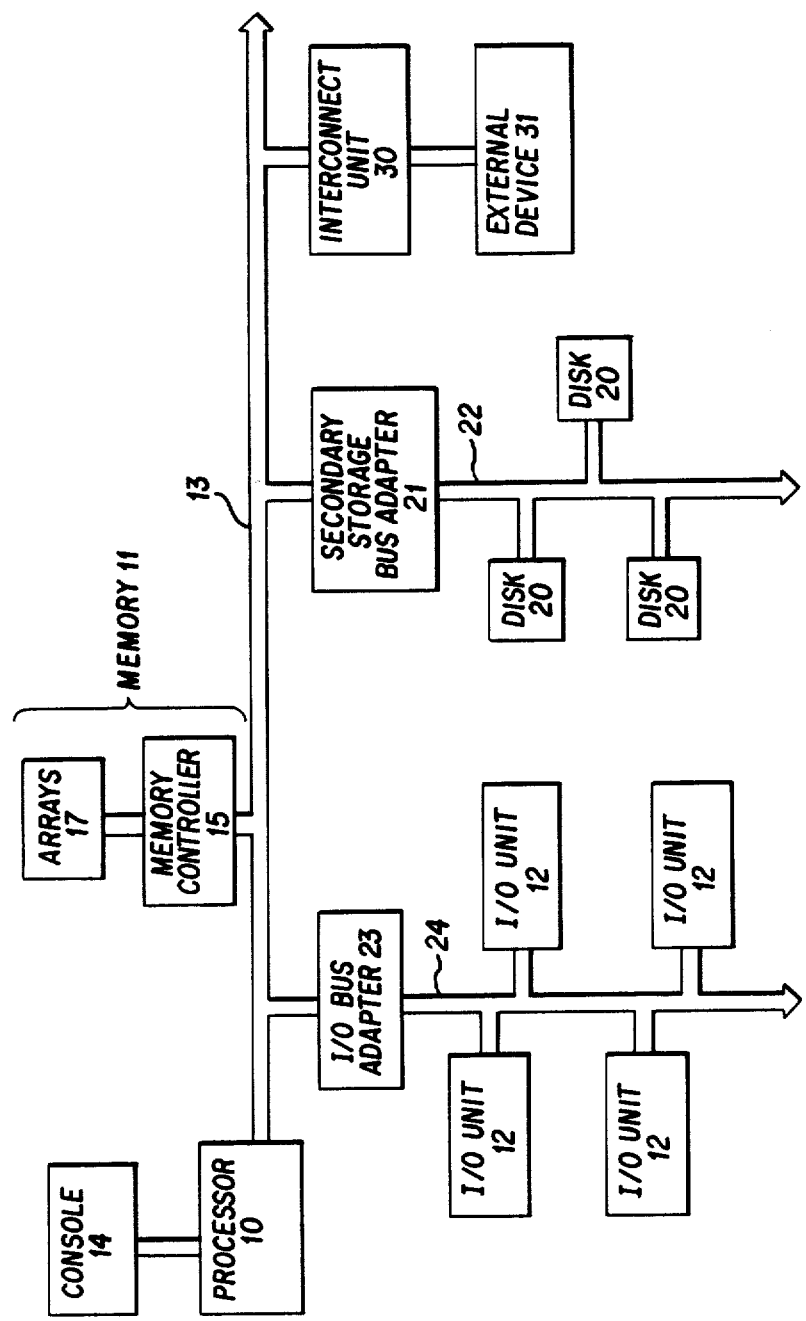
FIG. 1 is a block diagram of a digital data processing system including a new interconnect unit constructed in accordance with the invention.

Referring to FIG. 1, a data processing system including the invention includes, as basic elements, a processor 10, a memory 11 and one or more input/output units 12. A bus 13 interconnects the processor 10, memory 11 and input/output units 12 in parallel. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned for storage in the memory 11. The processor 10 also transmits control information to the input/output units 12, enabling them to perform selected operations, such as transmitting data to or retrieving data from the memory 11. Such data may include instructions or operands which may be transmitted to the memory 11 or processed data which is retrieved from the memory 11 for storage or display.

An operators console 14 serves as the operator's interface. It allows the operator to examine and deposit data, halt the operation of the processor 10 or step the processor 10 through a sequence of instructions and determine the responses of the processor 10 in response thereto. It also enables an operator to initialize the system through a boot strap procedure, and perform various diagnostic tests on the entire data processing system.

The memory 11 includes a memory controller 15, which is connected directly to the bus 13 and to a plurality of arrays 17. The arrays 17 contain a plurality of addressable storage location in which information is stored. The memory controller 15 receives transfer requests from the processor 10 or from an input/output unit 12 over the bus 13. The memory controller 15 may receive several types of transfer requests over bus 13, which fall into two general categories. In one category, information is written into, or stored in, a storage location, and in the other category, information is retrieved, or read, from a storage location.

The data processing system may include several types of input/output units 12, including disk and tape secondary storage units, teletypewriters, video display terminals, line printers, telephone and computer network units, and the like. All of these units communicate with the bus 13 over a device bus through one or more bus adapters. As shown in FIG. 1, the disk drives 20 are connected to a secondary storage bus adapter 21 over a device bus 22. The secondary storage bus adapter 21 is, in turn connected to bus 13. Others of input/output units 12 are connected to an input/output bus adapter 23 over a device bus 24.

In accordance with this invention, one of the input/output units 12 also includes an interconnect unit 30 that connects to an external device 31. The external device may comprise any of a number of different types of electronic equipment depending on the application to be performed. In one application, the external device 27 will comprise an array processor or special laboratory test equipment. In another application, the external device 27 will comprise another data processing system as shown in FIG. 1, with the connection to the interconnect unit 30 being through another interconnect unit 30 of similar construction.

Figure 2:
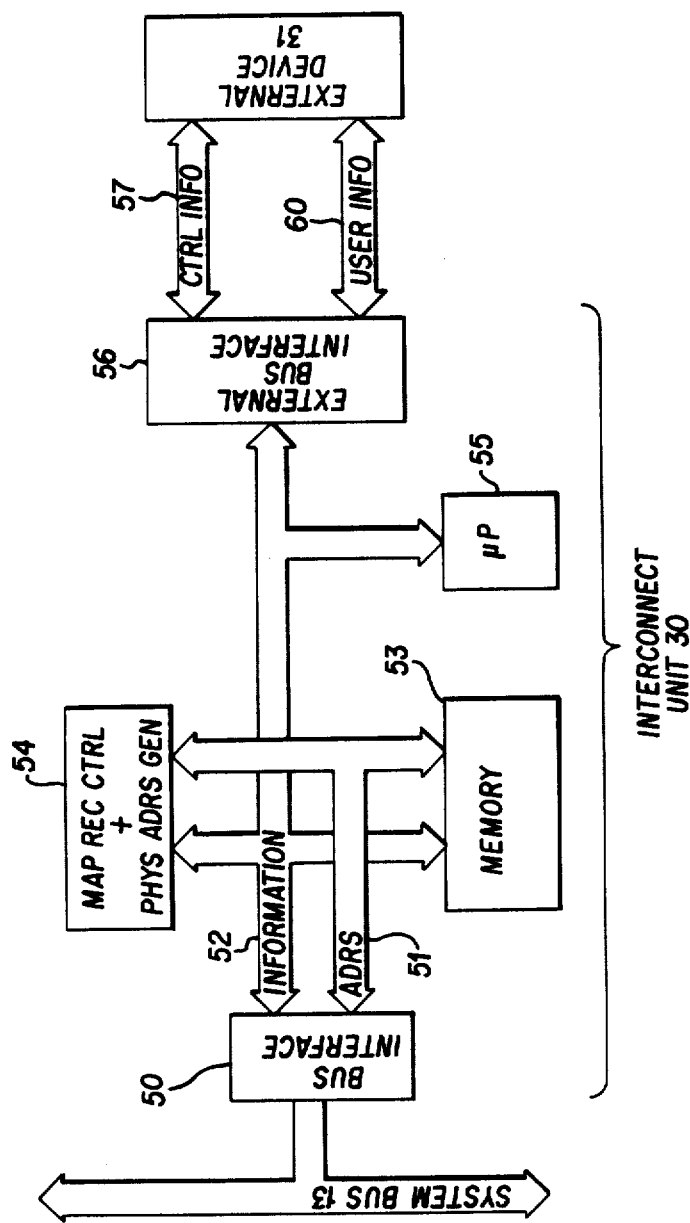
FIG. 2 is a block diagram of the interconnect unit depicted in FIG. 1.

FIG. 2 depicts, in functinal form, the interconnect unit 30 of this invention and its interconnections with th the bus 13 and external device 31. The interconnect unit 30 includes a bus interface circuit 50 that connects to bus 13 and receives and latches all of the signals therefrom at predetermined times in a well-known manner. Under some circumstances, certain of the signals received by the interconnect unit 30 from bus 13 comprise address signals, which identify addressable locations in the interconnect unit 30, followed by (or contemporaneous with) information signals which are to be latched in the location identified by the address. The interconnect unit 30 includes lines 51 for transmitting the received address signals and lines 52 for transferring the information signals to the various other circuits within the interconnect unit 30, including a local memory 53, a map register control and physical address generator circuit 54, and a microprocessor 55. A conventional microsequencer (not shown) connects to the elements depicted in FIG. 2 to control the operation of the interconnect unit 30 in transferring information between the memory 11 and the external device 31 as described below in connection with FIG. 5. The microsequencer operates in connection with operational command information provided directly by the processor 10 or indirectly from the processor 10 through microprocessor 55.

The address signals may also identify addressable locations in the external device 31, in particular control registers for controlling the transfer of user information between the interconnect unit 30 and the external device 31. The addresses and accompanying control information are transmitted by the interconnect unit 30 through the external bus interface 56 over a control information bus 57.

The control information bus 57 may also carry control information from the external device 31 to the interconnect unit 30. These signals are received in the external bus interface 56 and transmitted to other circuits in the interconnect unit 30 for processing. In some circumstances, the control information may require processing by the system's processor 10 (FIG. 1); if such processing is necessary, the interconnect unit 30 will interrupt the processor 10 over system bus 13 and request interrupt service in a conventional manner.

The control information received by the interconnect unit 30 from the processor 10 includes certain types of commands which enable the interconnect unit 30 to transfer information between the memory 11 (FIG. 1) and the external device 31. Preliminarily, the interconnect unit 30 transfers information with memory 11 in a "DMA" (direct memory access) transfer mode. In a DMA operation, the processor 10 provides three general items of information to the interconnect unit 30, including (1) the direction of transfer, that is, whether the information is to be transferred to or from the memory 11, (2) the starting address in memory 11 of the information to be transferred or into which the information is to be stored, and (3) the amount of information to be transferred. After that information is supplied, the interconnect unit 30 transfers information in blocks from or to consecutive locations in the memory 11, with the length of the block being identified by (3).

In one specific embodiment of the invention, the address (2) that is provided by the processor is not the actual physical address in memory 11, but is instead a virtual address which is translated into a physical address by the circuit 54 (FIG. 2) in a conventional manner. The physical address so translated identifies the physical location in memory 11 into or from which the information is to be coupled. In a transfer, the information is transferred using consecutive virtual addresses, which may not be consecutive physical locations in the memory 11.

After determining the physical address, the circuit 54 transmits it over the address lines 51 to the bus interface circuit 50. If information is to be transmitted to the memory 11, that information is received from the external device 31 over user information lines 60 through external bus interface 56 and is placed on the information lines 52 for transfer to the bus interface 50. The information may be transferred directly to the bus interface 50, or it may be buffered in memory 53. The bus interface 50 receives the address and information from lines 51 and 52 and transmits them over bus 13 in the transfer protocol required by that bus. If information is to be obtained from the memory, only the address is transmitted over address lines 51 through the bus interface 50 and over the bus 13, and the memory 11 returns the information from the addressed location over the bus 13 in a conventional manner. The information is received in the bus interface circuit 50 and transferred over the information lines 52, through external bus interface circuit 56 and over the user information lines 60.

For transfers of information in either direction, the information may be buffered in the memory 53. That is, if information is being received from the external device 31 faster that it can be transmitted over bus 13, some portion of the information may be temporarily stored in local memory 53. Similarly, if interconnect unit 30 obtains information from memory 11, in a transfer to the external device 31, if it can obtain information from the memory 11 faster than it can transfer it to the external device 31 over user information lines 60, the information may be temporarily buffered in local memory 53.

The local memory 53 also serves another purpose. In one specific embodiment, the bus 13 transfers information thirty-two bits (that is, four bytes) at a time. In that embodiment, depending on the nature of the external device 31, the interconnect unit 30 may transfer information over the user information lines 60 eight, sixteen, or thirty-two bits at a time. The local memory 53 is used for temporary storage of the information received in four byte groups from bus 13 through bus interface 50, which information is then transferred one, two or four bytes at a time through external bus interface 60 over user information lines 60. When information to be transferred to memory 11, it is received from the external device 31 over user information lines 60 through external bus interface 56 one, two or four bytes at a time and stored in local memory 53. Thereafter, the information is transferred out of local memory 53 four bytes at a time over information lines 52, through bus interface 50 and over bus 13 for storage in memory 11 (FIG. 1).

Figure 3:
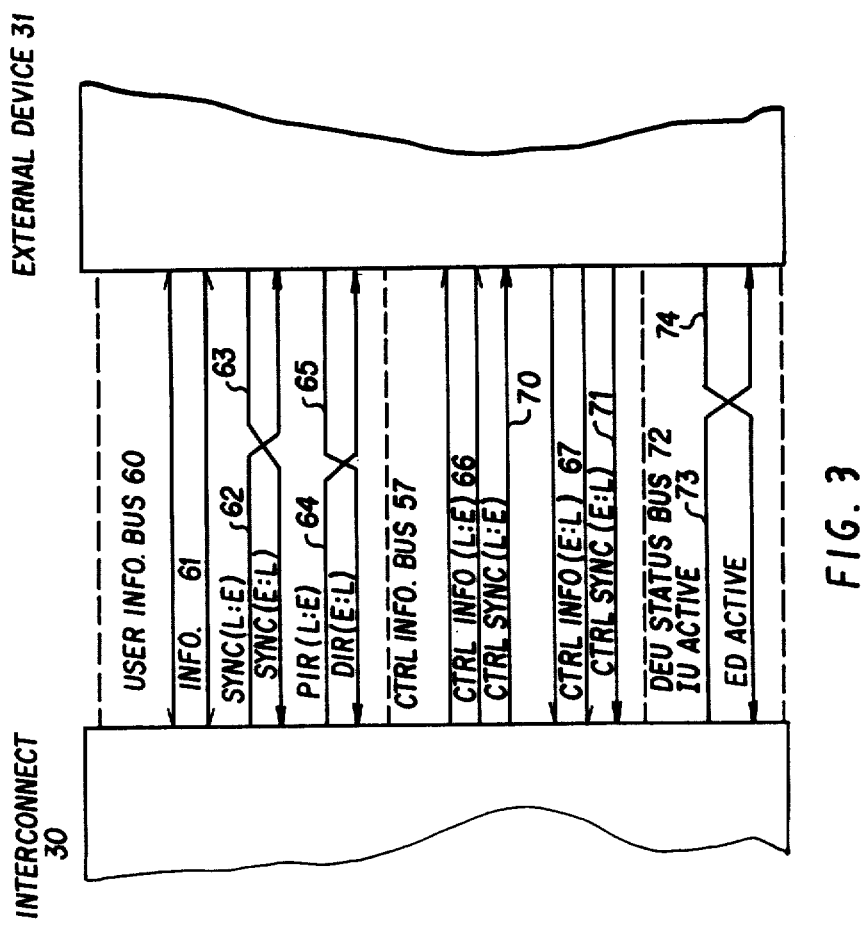
FIG. 3 is a detailed diagram of the point-to-point interconnect for transferring information between the interconnect unit depicted in FIG. 2 and an external device.

The various lines comprising control information bus 57 and user information bus 60 are depicted in FIG. 3. With reference to FIG. 3, the information bus 60 includes a set of information transfer lines 61 which transfers information bidirectionally between the interconnect unit 30 and the external device 31. Specifically, the information transferred over lines 61 comprises the information which has been obtained from, or is being transferred to, the memory 11 (FIG. 1). In one specific embodiment, the information transfer lines 61 comprise thirty-two lines which transfer information thirty-two, sixteen or eight bits at a time, with one bit being transferred over each line.

The informaton bus 60 also includes two lines for carrying synchronization signals. A line 62 carries a SYNC(L:E) local to external synchronization signal, and a line 63 carries a SYNC(E:L) external to local synchronization signal. The SYNC(L:E) local to external synchronization signal is transmitted from the interconnect unit 30 to the external device 31, and the SYNC(E:L) external to local synchronization signal is transmitted from the external device 31 to the interconnect unit 30. They are used to synchronize the transfer of information over the information transfer lines 61, in a manner which will be described below in connection with FIG. 4.

Finally, the information bus 60 includes two lines for carrying direction control signals. A line 64 carries a DIR(L:E) local to external direction signal, and a line 65 carries a DIR(E:L) external to local direction signal. The DIR(L:E) local to external direction signal is transmitted from the interconnect unit 30 to the external device 31, and the DIR(E:L) external to local direction signal is transmitted from the external device 31 to the interconnect unit 30. They are used to identify the direction of transfer of information over the information transfer lines 61, in a manner which will be described below in connection with FIG. 4.

The control information bus 57 includes two antiparallel control information transfer buses 66 and 67 for transferring information unidirectionally between the interconnect unit 30 and the external device 31. Control information bus 66 transfers CTRL INFO (L:E) control information signals from the interconnect unit 30 to the external device 31, and control information bus 67 transfers CTRL INFO (E:L) control information signals from the external device 31 to the interconnect unit 30.

The control information bus 57 also includes two lines 70 and 71, each of which carries a strobe signal for the associated control information transfer busses 66 and 67, respectively. Specifically, line 70 carries a CTRL SYNC (L:E) control synchronization signal from the interconnect unit 30 to the external device 31, and a line 71 carries a CTRL SYNC (E:L) control synchronization signal from the external device 31 to the interconnect unit 30. Each of the control synchronization signals is asserted to indicate when the condition of the signals on the associated control information transfer buses 66 and 67 has changed state, that is, when at least one of the signals on the buses has switched from an asserted to a negated condition or vice versa. A more detailed description of the signal protocol over the control information bus 57 will be presented below in connection with FIG. 4.

In addition to the user information bus 60 and the control information bus 57, a device status bus 72 transfers signals between the interconnect unit 30 and the external device 31 each indicating that the unit transmitting the respective signal is operative. Bus 72 includes a line 73 which carries an IU ACTIVE interconnect unit active signal fromthe interconnect unit 30 to the external device 31, which is asserted when the interconnect unit 30 is operative. The device status bus 72 also includes a line 74 which carries an ED ACTIVE external device active signal from the external device 31 to the interconnect unit 30, which is asserted when the external device 31 is operative.

FIGS. 4A and 4B depict the protocol for transferring user information over information bus 60 and control information over control information bus 57, respectively. The transfer protocols over both buses 57 and 60 are symmetric, that is, the assertions and negations of the synchronizing and direction control signals are the same in transfers from the interconnect unit 30 to the external device 31 and from the external device 31 to the interconnect unit 30. In FIGS. 4A and 4B, the "A" and "B" designations represent the "L" and "E" designations in FIG. 3.

For example, depending on the direction of transfer over information bus 60, the DIR(A:B) direction signal may correspond to the DIR(L:E) local to external direction signal in FIG. 3. If so, the DIR(B:A) direction signal corresponds to the DIR(E:L) external to local direction signal. In addition, the SYNC(A:B) synchronizing signal in FIG. 4A corresponds to the SYNC(L:E) local to external synchronization signal in FIG. 3, and the SYNC(B:A) synchronizing signal in FIG. 4A corresponds to the SYNC(E:L) external to local synchronization signal in FIG. 3. A similar correspondence is used between the signals represented in FIG. 4B and the signals depicted in FIG. 3.

With reference to FIG. 4A, when one unit, either the interconnect unit 30 or the external device 31, is to make a transfer to the other unit, it asserts it DIR(A:B) direction signal (time A). If the DIR(B:A) direction signal is not already negated, the unit waits until the signal is negated (time B), after which it places information signals on the information bus 60 (time C). A short time later, to allow the signals on the information bus 60 time to settle and deskew, the unit asserts its SYNC(A:B) synchronizing signal (time D). The other unit uses the SYNC(A:B) signal as a strobing signal, enabling it to latch the information signals on the information bus 60. Contemporaneously, the other unit asserts its SYNC(B:A) synchronizing signal (time E).

In response to the assertion of the SYNC(B:A) synchronizing signal at time E, the unit transmitting over the information bus 60 negates its SYNC(A:B) synchronizing signal and removes the information signals then on the information bus 60. Sometime later, in response to the negation of the SYNC(A:B) synchronizing signal, the other unit will negate its SYNC(B:A) synchronizing signal (time F).

If the unit has additional transfers to make over the information bus 60, it will place the next set of information signals, representing the next word of information to be transferred, onto the information bus 60 (time G), and after the deskewing time has passed, the unit asserts the SYNC(A:B) signal again (time H), and the sequence proceeds as in the first transfer (times E through F). After the unit has made all of the transfers required over information bus 60 to transfer all of the information to be transferred, the unit negates its DIR(A:B) direction control signal (time I). At that point the other unit may begin a transfer over the information bus 60.

With reference to FIG. 4B, when a unit is to make a transfer of control information over the control information bus 57, it places a word of control information signals CTRL INFO(A:B) corresponding to the control information to be transferred on the its control information lines 66 or 67 (time J). A selected time later, the unit asserts its CTRL SYNC(A:B) control synchronization signal (time K). The delay between times J and K is determined by the time required for the control information signals to deskew at the receiving unit. The receiving unit may use the CTRL SYNC(A:B) control synchronization signal to strobe the signals on the control information lines. A short time later, the transmitting unit negates the CTRL SYNC(A:B) control synchronization signals (time L) and removes the control information signals CTRL INFO(A:B) (time M). The sequence may be repeated for subsequent words of control information signals.

It will be appreciated that the protocol for transferring information over the information bus 60 (FIG. 4A) and the control information bus 57 (FIG. 4B) is much simpler than is the protocol for the communications device described in the aforementioned U.S. Pat. No. 4,319,323, and that it is much easier to construct an external device for connection to the interconnect unit 30 described herein than to the communications device described in that patent. Indeed, since the timing of the transfer of each word of information over the information lines 61 (FIG. 3) is governed by the SYNC(E:L)

external to local synchronization signal and the SYNC(L:E) local to external synchronization signal, rather than by a periodic synchronizing signal as in the communications device described in the patent, the stall condition can be readily accommodated. The transmitting unit does not assert its SYNC(A:B) synchronizing signal until it has placed a word of information signals onto the information lines 61. Accordingly, if it temporarily has no data to transmit, it does not assert its SYNC(A:B) signal until it does have information to transmit. Similarly, if the receiving unit is temporarily unable to receive a word of information being transmitting, it does not assert its SYNC(B:A) signal until it is able to accommodate the information word.

The protocol for transferring control information over the control information bus 57 is also simpler than in the aforementioned U.S. Pat. No. 4,319,323, as the receiving unit does not need to generate an acknowledgement signal. Furthermore, depending on the nature of the external device 31, the CTRL INFO (L:E) control information signals may comprise information words, which are transferred in synchronism with the respective CTRL SYNC (E:L) control synchronization signal and CTRL SYNC (L:E) control synchronization signal. Alternatively, they may comprise continually-monitored control or status signals, with the control synchronization signals being ignored.

Figure 5:
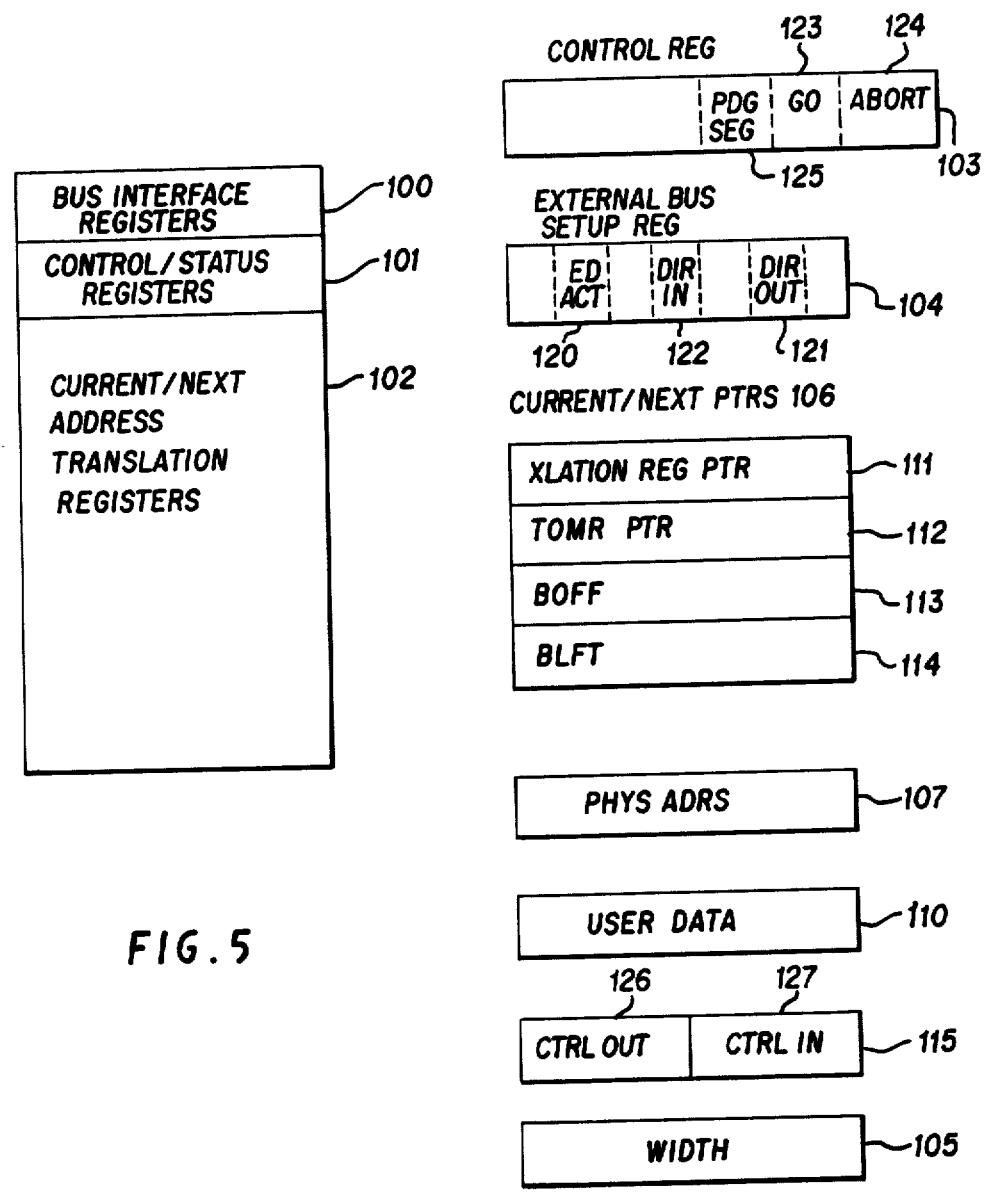
FIG. 5 depicts certain data structures in the information transfer unit shown in FIG. 2.

FIG. 5 depicts a plurality of information structures in the interconnect unit 30 used by the processor 10 (FIG. 1) and microprocessor 55 (FIG. 2) for controlling the operation of the interconnect unit 30. Initially, it should be noted that one embodiment of the interconnect unit 30 is used in a data processing system, and is connected to a system bus, which is described in U.S. Patent Application Ser. No. 534,829 filed Sept. 22, 1983 in the name of Frank C. Bomba, et al., and entitled Arbitration Mechanism For Assigning Control Of A Communications Path In A Digital Computer System, and assigned to the assignee of this application. One embodiment of the system bus is a BI bus that is incorporated into a VAX8200 digital data processing system sold by the assignee of this invention.

With reference to FIG. 5, the information structures in the interconnect unit 30 are divided into three general categories, including a set of bus interface registers 100, a set of control and status registers 101, and a set of address translation registers 102. The bus interface registers, which are included in the bus interface 50 (FIG. 2) generally control the operation of the interconnect unit 30 over system bus 13 (FIG. 1). They contain such information as the type of device, whether bus errors have occurred and the nature of any bus errors, whether the device may transmit an interrupt request, the address space of the address signals on the system bus 13 to which the device will respond, and so forth.

The address translation registers 102 contain the information required by the map registers control and physical address generator circuit 54 (FIG. 2) to generate the physical addresses from the virtual address supplied to the interconnect unit 30 by processor 10. The registers 102 are loaded by the processor 10 (FIG. 1) prior to any transfers between the interconnect unit 30 and the external device 31 and identify sequentially the pages in the system memory 11 into which the information from information bus 60 is to be stored, or from which information to be transmitted over information bus 60 is to be obtained. Registers 102 include two sets of registers, one set which is used during a current transfer (which are identified as "CURRENT" registers in FIG. 5) and a second set which may be loaded during a current transfer for a subsequent transfer (which are identified as "NEXT" registers in FIG. 5). The set of registers 102 which are used as "CURRENT" registers are identified by a pointer in the control and status registers, which are described below.

The remaining registers depicted in FIG. 5 comprise the control and status registers 101. They include a control register 103, an external bus set-up register 104, and a bus width register 105, which control the transfers of information over information bus 60, all of which are used by the microsequencer in controlling the interconnect unit 30 in transferring information over the information bus 60. Initially, the processor 10 loads register 105 with a code which identifies the number of bits of information to be transmitted over information bus 60 at a time. When the interconnect unit 30 is to engage in a transfer, the processor 10 (FIG. 1) initially tests a flag 120 in setup register 104 to determine whether the external device is active. The state of this flag reflects the current state of line 74 (FIG. 3), and in particular whether the ED ACTIVE signal is asserted. If it is, the external device 31 can engage in a transfer.

If a transfer over the information bus 60 is to be to the external device 31, the processor 10 sets a DIR OUT flag 121, which causes the assertion of the DIR(L:E) local to external direction signal on line 64. When a DIR IN flag 122 indicates that the DIR(E:L) external to local direction signal has been negated, the processor 10 loads a value in a GO flag 123 of control register 103 which enables the transfer to proceed. The transfer continues until completed normally, as described below, or until the processor 10 sets an ABORT flag 124 in register 103.

On the other hand, the processor 10 also periodically monitors the DIR IN flag 122 to determine whether the condition of the DIR(E:L) external to local direction signal indicates that the external device 31 is to transmit information over information bus 60 to the interconnect unit 30. When the DIR IN flag is set, the external device 31 is to transmit information, and the processor 10 clears the DIR OUT flag 121 to ensure that the DIR(L:E) local to external direction signal is negated and sets the GO flag 123. The interconnect unit 30 then receives information over information bus 60 until the transfer is completed normally, as described below, or until the processor 10 sets the ABORT flag in register 103.

On transfers of information to the external device 31 from the interconnect unit 30, a register 110 contains the information to be transferred over information lines 61 of information bus 60. On transfers to the interconnect unit 30 from the external device 31, the same register 110 is receives the information from the external device 31. During a transfer over information bus 60 in either direction, pointers 106 identify the current state of the transfer. In particular, a BLFT bytes left register 114, which is initially loaded by the processor with the number of bytes to be transferred, is decremented when each byte of information is transmitted or received over the information bus 60. When the contents of the BLFT bytes left register 114 reach zero, the transfer is ended.

In addition, three registers in pointers 106 are used in connection with the virtual address translation, including a translation register pointer 111, a TOMR top of map registers pointer 112, and an offset register 113. The translation register pointer 111 identifies the register in address translation registers 102 which is being used in connection with the virtual to physical address translation. The contents of the register identified by the pointer 111 identify the page in memory 11 with respect to which the transfer is to occur. For transfers to or from the first page, the contents of the offset register 113 identify the beginning location in the page in system memory 11 into which the information is to be stored, or from which the information is to be retrieved. The contents of offset register 13 are only used during the initial transfer to or from the first page in memory 11 so that transfers do not have to begin at the beginning of the page; transfers to subsequent pages begin at the beginning of the page.

For the first transfer to or from the memory 11, the contents of the offset register 113 are concatenated to the contents of the register 102 pointed to by the translation register pointer 111 as the least significant bits thereof. The result, which is a physical address, is then stored in a physical address register 107. The contents of physical address register 107 are used by bus interface circuit 50 in transferring information to or from memory 11 (FIG. 1). If information is being transferred to memory 11, that information is in register 110 and is transmitted by bus interface circuit 50 to memory 11. Alternatively, if the information is being received from the memory 11, the information is stored in the register 110 before being transferred over the information bus 60 to external device 31.

Whenever the interconnect unit 30 transfers a word of information to or from memory 11, the contents of the physical address register 107 are incremented. When the contents have reached the maximum number of bytes in a page, they are reset and the contents of the pointer 111 are incremented to identify the next page to receive information. The contents of pointer 111 are then compared to the contents of pointer 112, and if they are equal, the transfer terminates regardless of the contents of register 114. If the contents of pointers 111 and 112 are not equal, the transfer continues. The contents of the address translation register that is then pointed to by the translation register pointer 111 are transferred to the most significant portion of the physical address register, and the transfer continues.

As has been mentioned, the interconnect unit 30 includes two sets of address translation registers so that the processor 10 can set up an information transfer while a transfer is currently taking place. The interconnect unit 30 includes two sets of pointers 106, one for the current transfer and the other for the next transfer. A pointer (not shown) identifies the current and next transfer pointers, and a PDG SEG pending segment transfer flag 125 in control register 103 is set by the processor 10 when another transfer has been set up.

Control information is transferred through another register, namely register 115. A CTRL OUT segment 126 of register 115 is used for transfers of control information over lines 66 of control information bus 57. To determine control information being transmitted over lines 67, the processor may read the CTRL IN segment 127 of register 115. The processor 10 may read the CTRL In segment when the external device 31 asserts the CTRL SYNC (E:L) control synchronization signal. The assertion of the CTRL SYNC (E:L) control synchronization signal which may result in an interrupt to the processor 10 enabling it, in turn to read the register. Alternatively, the interconnect unit 30 may ignore the CTRL SYNC (E:L) control synchronization signal, and the processor may read the register periodically.

As has been noted, the microprocessor 55 (FIG. 2) may also provide command information for controlling the interconnect unit 30. Rather than requiring the processor 10 to directly load transfer command and control information into the registers (FIG. 5) that control the interconnect unit 30, information may be loaded into queues and the microprocessor 55 may be programmed to iteratively retrieve the information, load it into the proper registers, monitor the contents of various registers, and otherwise supervise the transfers. After each transfer, the microprocessor may transfer an indication that the transfer was completed to another queue.

In one specific embodiment, the microprocessor 55 communicates with the other elements of the interconnect unit 30 through the map register control and physical address generating circuits 54. With reference to FIG. 2, the microprocessor 55 both transmits address signals and transfers information signals over information lines 52 to circuits 54. If the address signals from the microprocessor identify a location in circuits 54, the information is received and used by those circuits, if the transfer is from the microprocessor. Alternatively, if information is to be transferred to the microprocessor, the circuits 54 transmit the information signals over information lines 52, which signals are received by the microprocessor.

If, on the other hand, the address signals identify locations in other parts of the interconnect unit 30, particularly the memory 53 or bus interface 50, the circuits 54 transmit the address signals, which they receive from the microprocessor 55 over the information lines, over the address lines 51. If the information is to be transferred to the addressed circuit, the circuit receives the information signals over the information lines 52, and if the information is to be transferred to the microprocessor 55, the circuit transmits the information over the information lines 52.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An interconnect unit for connection to a system bus in a digital data processing system including a memory for storing information and a processor means for controlling the system, said interconnect unit transferring information between the memory over said system bus and an external device over an external bus, said external bus including bidirectional information transfer lines for transferring information signals, antiparallel unidirectional direction control lines having selected conditions for transferring direction control signals identifying a direction of transfer of information and antiparallel unidirectinal synchronization lines for transferring synchronization signals, in response to commands from the processor means, said interconnect unit including:

A. system transfer means for connection to said system bus for transferring information to or from said memory, B. external device transfer means including means for connection to said external bus for transmitting and receiving information over said external bus, and further including information transfer means connected to said system transfer means and for connection to said information transfer lines for transferring information between said system transfer means and said information transfer lines, said direction control lines asserting a signal on one of said direction control lines and receiving a signal on a second of said direction control lines identifying a condition of the direction of transfer of information over said information transfer lines, said synchronization lines asserting a signal on one of said synchronization lines and receiving a signal on a second of said synchronization lines to synchronize the transfer of information over said information transfer lines, and C. control means for operational control of the interconnect unit in transferring information over said information transfer lines, said control means including a first register enabling the transmission and reception of the direction control signals over the respective direction control lines to identify the direction of transfer, said control means enabling the selection of transmission or reception of information signals over said information transfer lines responsive to the condition of said direction control signals, and said control means enabling a synchronization signal to identify:

I. when information signals are being transferred over said information transfer lines when said direction control signals indicate that information is being transferred to said external device to enable said external device to receive said information signals, or II. when information signals have been received from said information transfer lines when said direction control signals indicate that information is being transferred from said external device.

2. An interconnect unit as defined in claim 1 in which said external bus further includes unidirectional antiparallel control information lines for transferring control information signals and synchronization control lines for transferring synchronization control signals, said interconnect unit further including a second register for transmitting and receiving control information signals over respective ones of said control information transfer lines, said synchronization control signal transfer lines transmitting and receiving synchronization control signals over respective ones of said synchronization control signal transfer lines, and C. said control means for operational control of the interconnect unit enabling said second register to transmit control information over one of said respective control information transfer lines and said control means transmitting a contemporaneous synchronization control signal over one of said synchronization control signal transfer lines to enable said external unit to receive said control information signals, and said control means enabling said second register to receive control information signals over a second of said respective control information transfer lines in response to the receipt of a synchronization signal over a corresponding synchronization control signal transfer line.

3. An external unit for connection to a digital data processing system for transferring information with said data processing system over an external bus, said external bus including bidirectional information transfer lines for transferring information signals, antiparallel unidirectional direction control lines having selected conditions for transferring direction control signals and antiparallel unidirectional synchronization lines for transferring synchronization signals, said external unit including:

A. external device transfer means including means for connection to said external bus for transmitting and receiving information over said external bus, and further including information transfer means connected to said system transfer means and for connection to said information transfer lines for transferring information between said system transfer means and said information transfer lines, said direction control lines asserting a signal on one of said lines and receiving a signal on a second of said lines identifying a condition of the direction of transfer of information over said information transfer lines, said synchronization lines asserting a signal on one of said synchronization lines and receiving a signal on a second of said synchronization lines to synchronize the transfer of information over said information transfer lines, and B. control means for operational control of the interconnect unit in transferring information over said information transfer lines, said control means including a first register enabling the transmission and reception of the direction control signals over the respective direction control lines to identify the direction of transfer, said control means enabling the selection of transmission or reception of information signal over said information transfer lines responsive to the condition of said direction control signals, and said control means enabling a synchronization signal to identify:

I. when information signals are being transferred over said information transfer lines when said direction control signals indicate that information is being transferred to said external device to enable said external device to receive said information signals, or II. when information signals have been received from said information transfer lines when said direction control signals indicate that information is being transferred from said external device.

4. An external unit as defined in claim 3 in which said external bus further includes unidirectional antiparallel control information lines for transferring control information signals and synchronization control lines for transferring synchronization control signals, said interconnect unit further including a second register for transmitting and receiving control information signals over respective ones of said control information transfer lines, said synchronization control signal transfer lines transmitting and receiving synchronization control signals over respective ones of said synchronization control signal transfer lines, C. said control means for operational control of the interconnect unit enabling said second register to transmit control information over one of said respective control information transfer lines and said control means transmitting a contemporaneous synchronization control signal over one of said synchronization control signal transfer lines to enable said external unit to receive said control information signals, and said control means enabling said second register to receive control information signals over a second of said respective control information transfer lines in response to the receipt of a synchronization signal over a corresponding synchronization control signal transfer line.

5. An interconnect unit as defined in claim 1, as external bus further including antiparallel unidirectional status indicating lines, said external device transfer means further including a status indicating control means for connection to said antiparallel unidirectional status indicating lines and responsive to said control means for operational control of the status indicating control means, for transmitting a signal over one of said status indicating lines and receiving a signal from a second of said status indicating lines to indicate the status of transmitting unit.

6. An external unit as defined in claim 3, said external bus further including antiparallel unidirectional status indicating lines, said external device transfer means further including a status indicating control means for connection to said antiparallel unidirectional status indicating lines and responsive to said control means for operational control of the status indicating control means, for transmitting a signal over one of said status indicating lines and receiving a signal from a second of said status indicating lines to indicate the status of the transmitting unit.

* * * * *